(12) United States Patent
Hardage (10) Patent No.: US 8,250,346 B2
(45) Date of Patent: Aug. 21, 2012

(54) REGISTER RENAMING OF A PARTIALLY UPDATED DATA GRANULE

(75) Inventor: James Nolan Hardage, Austin, TX (US)

(73) Assignee: ARM Limited, Cambridge (GB)

( * ) Notice: Subject to any disclaimer, the term of this patent is extended or adjusted under 35 U.S.C. 154(b) by 482 days.

(21) Appl. No.: 12/457,261

(22) Filed: Jun. 4, 2009

(65) Prior Publication Data

US 2010/0312989 A1 Dec. 9, 2010

(51) Int. Cl.
*G06F 9/38* (2006.01)
(52) U.S. Cl. ......................................... 712/217
(58) Field of Classification Search .................... 712/217
See application file for complete search history.

(56) References Cited

U.S. PATENT DOCUMENTS

| | | | | |
|---|---|---|---|---|
| 5,768,556 A | * | 6/1998 | Canada et al. | 712/216 |
| 5,826,070 A | * | 10/1998 | Olson et al. | 712/222 |
| 2005/0027968 A1 | * | 2/2005 | Rupley et al. | 712/217 |

* cited by examiner

*Primary Examiner* — William M Treat
(74) *Attorney, Agent, or Firm* — Nixon & Vanderhye P.C.

(57) ABSTRACT

A processor 2 supporting register renaming has a rename table 20 in which the flag register has multiple tag values associated therewith. These tag values indicate which virtual register corresponds to a destination flag register of the oldest instruction which wrote a still up-to-date value of a subset of the flags.

16 Claims, 6 Drawing Sheets

| inst# | inst | src tag | renamed dst | rename table | | | dependency chain |
|---|---|---|---|---|---|---|---|
| | | | | rf | rf | rf | |
oldest 0 produce NZCV rf 0 0 0 0 --\ --\
1
3
4 produce NZC 0 1 1 1 0 <-/--\ |
5
6
7
8 produce NZ 1 2 2 1 0 <-/ |
9
10
11
12 produce NZ 1 3 3 1 0 <-/ ///lengthened
13
14
15 produce NZC 0 4 4 4 0 <-///lengthened
16
youngest 17 produce NZCV - 5 5 5 5 //eliminated

FIG. 6

REGISTER RENAMING OF A PARTIALLY UPDATED DATA GRANULE

BACKGROUND OF THE INVENTION

1. Field of the Invention

This invention relates to the field of data processing systems. More particularly, this invention relates to register renaming within data processing systems.

2. Description of the Prior Art

It is known to provide out-of-order data processing systems which utilise register renaming techniques to remove or reduce data dependencies between instructions in a manner which permits a higher degree of parallelisation and/or out-of-order instruction issue. Within such systems, as an instruction is decoded it is determined which architectural registers will serve as destination registers for that instruction and which architectural registers will serve as source registers for that instruction. The system is provided with virtual registers that are greater in number than the architectural registers and may be mapped to architectural registers via a rename table. The rename table will indicate which virtual registers are currently available for use as a destination register. Accordingly, a free/available virtual register will be selected and allocated as the destination register for that instruction. The entry in the rename table will then indicate which virtual register corresponds to that architectural register at the current position within the program flow. In a similar manner, decoding of the instruction will determine which architectural source register(s) are required and will examine the rename table to identify the virtual registers which are currently assigned to store the up-to-date content of the architectural source register(s) at the current point within the program flow.

Using this register mapping information within the rename table the instruction issue/scheduling mechanisms can determine when an instruction is appropriate to issue for execution. One approach is to wait until the source registers for that instruction are all available, i.e. had all been written to the virtual registers as indicated within the rename table.

It will be seen that instructions are delayed in their issue until the content of their source registers is available to be read. Thus, it is desirable to increase the available time between the issue of an instruction which will generate the content of a source register for a later instruction and the time at which it is desired to issue that later instruction. If these dependencies can be lengthened in time, then it is more likely that the source register content will be available when it is desired to issue the later consuming instruction and accordingly the consuming instruction will not have to have its issue delayed waiting for generation of its sources.

It is also known to provide program instructions which set program flags. An example of such instructions are the instructions of the Thumb instruction set of the processors produced by ARM Limited of Cambridge, England. Substantially all of the instructions of the Thumb instruction set set one or more of a plurality of flags. These flags indicate processor state conditions arising out of the execution of the instructions, such as the generation of an overflow, the generation of a carry, the occurrence of a zero result etc. In the architecture concerned there are four flags namely N, Z, C and V. These flags are held within a flag register referred to as the CPSR (current program status register). Not all of the flags are updated by every instruction. Accordingly, one source register input to an instruction which does not update all of these flags will be the most recent copy of the CPSR as generated by a preceding instruction. This is required as since the current instruction will only write some of the flag values within the CPSR, the other of the flag values will have to be taken from their previous values as set by the preceding instruction(s). A problem with this approach is that the dependency chain is very short with most instructions requiring as a source the flag register as generated by the preceding instruction. This hinders rapid operation and efficient scheduling.

Similar problems can also arise with other data granules that are dependencies between instructions.

SUMMARY OF THE INVENTION

Viewed from one aspect the present invention provides an apparatus for processing data comprising:

processing circuitry responsive to a stream of program instructions having a program order running from old to young to perform a corresponding stream of data processing operations, at least some of said data processing operations writing one or more values to at least a portion of a data granule;

a register store having a plurality of registers each for storing a data granule written in dependence upon said data processing operations;

register renaming circuitry responsive to a program instruction of said stream of program instructions specifying a data processing operation to identify a destination register to store a data granule that is an output operand of said data processing operation; and rename table circuitry coupled to said register renaming circuitry and responsive to identification of said destination register to store tag data identifying said destination register as storing a latest copy of said data granule, said processing circuitry being responsive to said tag data to identify a source register currently associated with an oldest up-to-date copy of one or more values that are an input operand of a younger program instruction within said stream of program instruction; wherein different groups of data processing operations set different values within said data granule;

said tag data comprises a plurality of tag values, different tag values tracking writes to differing subsets of values of said data granule; and said rename table circuitry is responsive to said data processing operation to determine which of values of said data granule are updated values written by said data processing operation and:

(i) to store tag values identifying said destination register as storing at least one of said updated values to those tag values tracking writes to at least one of said updated values; and (ii) to leave those tag values not tracking writes to at least one of said updated values as identifying respective destination registers storing values set by one or more preceding processing operations.

The present technique recognises that it can be determined that a data granule (such as a flag register) may only be partially updated by certain program instructions. Thus, by using multiple tag values associated with the data granule and indicating respectively which registers store the oldest up-to-date copies of different portions of the data granule, it is possible to lengthen the dependencies such that instructions which will themselves overwrite a portion of the data granule need only draw the remaining non-overwritten portion from the oldest available source register which has an up-to-date copy of that non-overwritten portion. This lengthening of the dependency chain between instructions enhances the ability to issue instructions without undue delay waiting for their sources to be available.

This technique is well suited to systems in which each tag value has a set of written values (such as written flags) with these sets of written values being related in a hierarchy such that when traversing the hierarchy from the set with the fewest element to a set with the most elements, each set is a proper subset of (i.e. contains fewer elements than) any of the following sets. This allows for a relatively compact set of tag values to be associated with the data granule.

While it will be appreciated that the data granule could take a variety of different forms, such as a single instruction multiple data (SIMD) register or a register within a register store accessible using a plurality of different sized registers (such that aliasing between registers can occur), the invention is well suited to addressing the problems associated with flag values in which case the data granule is a plurality of flags (e.g. program status flags) and the plurality of registers are a plurality of flag registers (virtual flag registers).

In this context, the flags may comprise four flags N, Z, C and V formed into sets with a first set comprising flags N and Z, a second set comprising flags N, Z and C, and a third set comprising flags N, Z, C and V.

The present technique is well suited to systems in which a plurality of processing operations are performed in parallel, particularly when these processing operations are non-conditional. An example of an instruction set to which the present technique can be applied to advantage is the Thumb instruction set referred to above.

The present technique is also well suited to processing circuitry that performs out-of-order execution of the program instructions in a plurality of processing cycles.

Viewed from another aspect the present invention provides an apparatus for processing data comprising:

processing circuitry responsive to a stream of program instructions having a program order running from old to young to perform a corresponding stream of data processing operations, at least some of said data processing operations setting one or more flags within a plurality of flags;

a register store having a plurality of flag registers each for storing flag values set in dependence upon said data processing operations;

register renaming circuitry responsive to a program instruction of said stream of program instructions specifying a data processing operation to identify a destination flag register to store one or more flags that are an output operand of said data processing operation; and rename table circuitry coupled to said register renaming circuitry and responsive to identification of said destination flag register to store tag data identifying said destination flag register as storing a latest copy of said plurality of flags, said processing circuitry being responsive to said tag data to identify a source flag register currently associated with an oldest up-to-date copy of one or more flags that are an input operand of a younger program instruction within said stream of program instruction; wherein different groups of data processing operations set different flags within said plurality of flags;

said tag data comprises a plurality of tag values, different tag values being associated with differing subsets of flags of said plurality of flags; and said rename table circuitry is responsive to said data processing operation to determine which of said plurality of flags are updated flags set by said data processing operation and:

(i) to store said tag data identifying said destination flag register as at least part of those tags values associated with at least one of said updated flags; and (ii) to leave those tag values not associated with at least one of said updated flags as identifying respective destination flag registers storing flag values set by one or more preceding processing operations.

Viewed from a further aspect the present invention provides an apparatus for processing data comprising:

processing means responsive to a stream of program instructions having a program order running from old to young for performing a corresponding stream of data processing operations, at least some of said data processing operations writing one or more values to at least a portion of a data granule;

register store means having a plurality of registers each for storing a data granule written in dependence upon said data processing operations;

register renaming means responsive to a program instruction of said stream of program instructions specifying a data processing operation for identifying a destination register to store a data granule that is an output operand of said data processing operation; and rename table means coupled to said register renaming means and responsive to identification of said destination register to store tag data identifying said destination register as storing a latest copy of said data granule, said processing means being responsive to said tag data to identify a source register currently associated with an oldest up-to-date copy of one or more values that are an input operand of a younger program instruction within said stream of program instruction; wherein different groups of data processing operations set different values within said data granule;

said tag data comprises a plurality of tag values, different tag values tracking writes to differing subsets of values of said data granule; and said rename table means is responsive to said data processing operation to determine which of values of said data granule are updated values written by said data processing operation and:

(i) to store tag values identifying said destination register as storing at least one of said updated values to those tag values tracking writes to at least one of said updated values; and (ii) to leave those tag values not tracking writes to at least one of said updated values as identifying respective destination registers storing values set by one or more preceding processing operations.

Viewed from a further aspect the present invention provides a method of processing data comprising:

in response to a stream of program instructions having a program order running from old to young, performing a corresponding stream of data processing operations, at least some of said data processing operations writing one or more values to at least a portion of a data granule;

storing a data granule written in dependence upon said data processing operations in a register of a register store having a plurality of registers;

in response to a program instruction of said stream of program instructions specifying a data processing operation, identifying a destination register to store a data granule that is an output operand of said data processing operation; and in response to identification of said destination register, storing tag data identifying said destination register as storing a latest copy of said data granule and in response to said tag data to identifying a source register currently associated with an oldest up-to-date copy of one or more values that are an input operand of a younger program instruction within said stream of program instruction; wherein different groups of data processing operations set different values within said data granule;

said tag data comprises a plurality of tag values, different tag values tracking writes to differing subsets of values of said data granule; and in response to said data processing operation, determining which of values of said data granule are updated values written by said data processing operation and:

(i) storing tag values identifying said destination register as storing at least one of said updated values to those tag values tracking writes to at least one of said updated values; and (ii) leaving those tag values not tracking writes to at least one of said updated values as identifying respective destination registers storing values set by one or more preceding The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
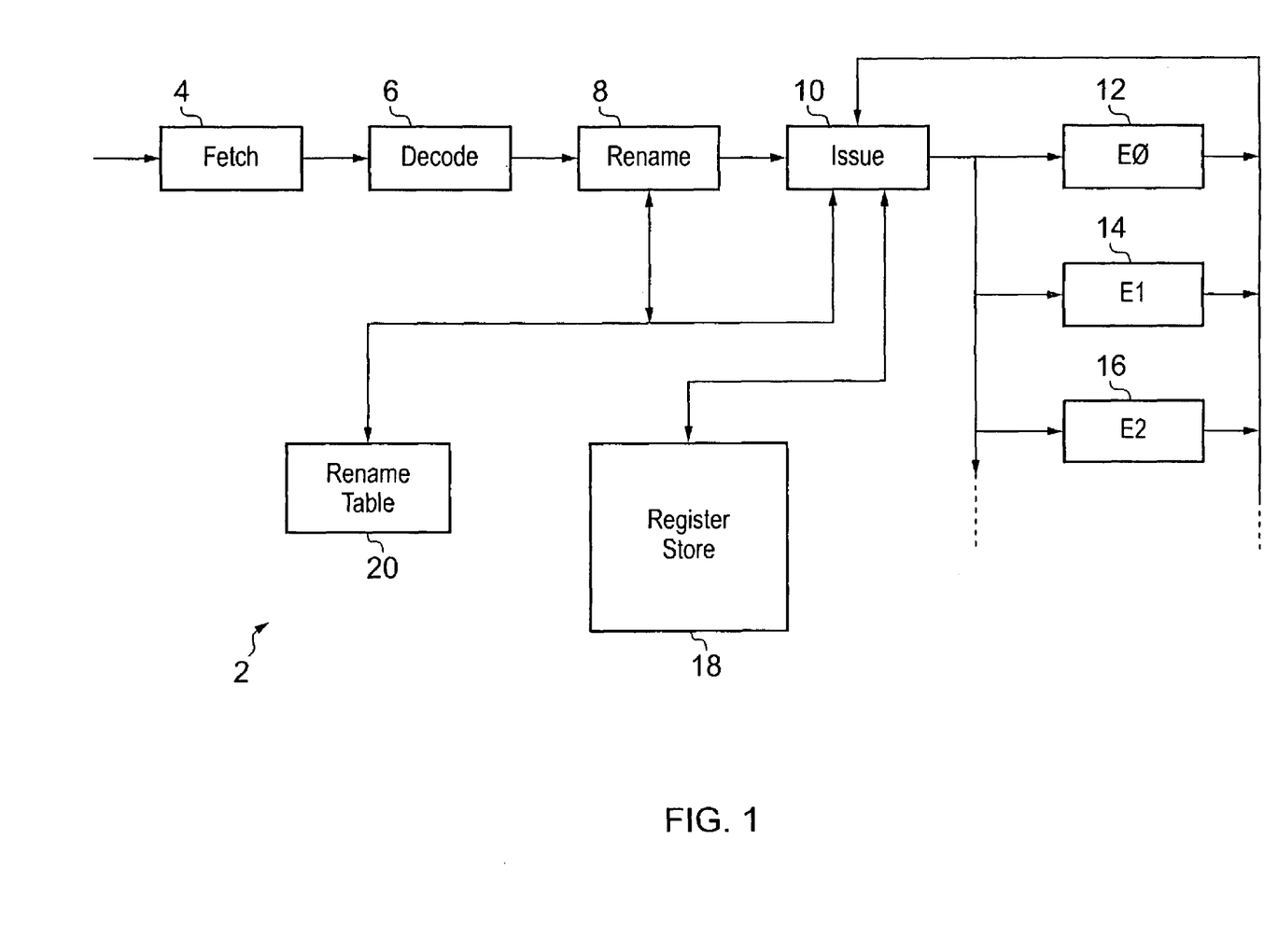
FIG. 1 schematically illustrates a portion of an out-of-order processor using register renaming and performing parallel issue of program instructions that execute over multiple processing cycles.

FIG. 1 illustrates a processor 2 incorporating an instruction pipeline having a fetch stage 4, a decode stage 6, a rename stage 8, an issue stage 10 and multiple execution stages 12, 14, 16. Such a processor 2 is suited to support of out-of-order program execution as a stream of program instructions are fetched from memory by the fetch stage 4 and then subject to decoding, register renaming and issue by the issue stage 10. The instructions will typically be executed in parallel within the execution stages 12, 14, 16 over multiple processing cycles.

The processor 2 includes a register store of virtual registers 18. These virtual registers are mapped to architectural registers as specified by the program instructions which are being executed. A rename table 20 stores tag data indicating the relationship between architectural registers and virtual registers at any point in the program flow. The use of register renaming and a rename table will in themselves be familiar to those in this technical field.

Figure 2:
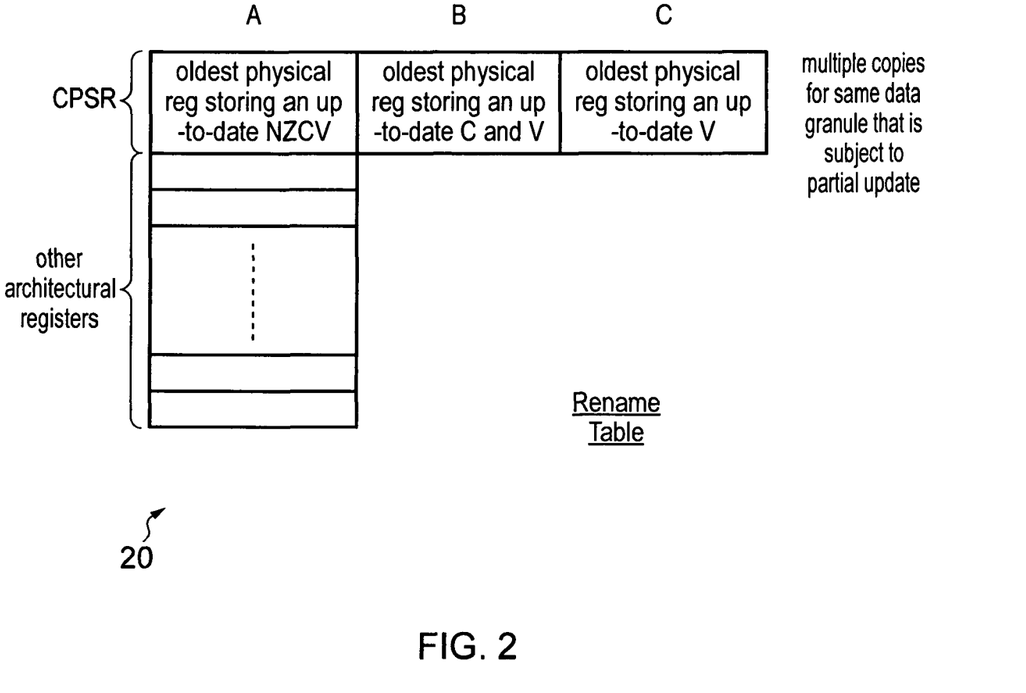
FIG. 2 schematically illustrates a rename table for use in register remapping.

FIG. 2 schematically illustrates the rename table 20 of the present technique in more detail. In particular, it will be seen that for the architectural flag register CPSR, multiple tag values are provided. This contrasts with the other architectural registers for which a single tag value is provided indicating which virtual register is currently allocated to the most up-to-date copy of the content of that architectural register given the current point in the program flow. It will be appreciated that these virtual registers may not yet hold the data which is to be written to them, but they are nevertheless allocated as the destination registers to which that data will be written given the current point in the program flow by the preceding instructions which are generating that data (the tag data may include a valid bit indicating when the virtual register has been written).

The flag register CPSR is provided with multiple tag values as it represents a data granule that is subject to partial update in a manner which can be predicted when an instruction is decoded. The same is also true of certain SIMD instructions and certain instructions accessing/modifying a register file in which multiple different register sizes are supported whereby only a portion of a large register may be updated by a write to an aliasing smaller register.

Returning to FIG. 2, it will be seen that the flag register CPSR has three tag values namely A, B and C. Tag value A stores a value indicating the oldest virtual register storing an up-todate copy of all of the four flag values N, Z, C and V. These are the flag values associated with the Thumb instruction set referred to above. The tag value B indicates the oldest virtual register storing an up-to-date copy of the flags C and V. The tag value B may indicate an older register than the tag value A as it may be that a more recent instruction has updated one of N and Z, whereas the last time one of C and V was updated was an older instruction. Accordingly, a to-be-issued instruction which will itself write N and Z and only requires to read previous values of C and V can draw these from the older virtual register indicated by tag value B rather than the more recent register indicated by tag value A.

In a similar manner, the tag value C indicates the oldest virtual register storing an up-to-date value of flag V. Thus, a to-be-issued instruction which will update flags N, Z, C and only requires to read the previous up-to-date value of V can take this from the virtual register indicated by tag value C.

It will be appreciated that if an instruction is executed which updates all of N, Z, C and V, then the three tag values A, B and C will all be updated to refer to the virtual register to which these new flag values N, Z, C and V were written. However, for instructions which do not write to all of the flag values N, Z, C and V, fewer than all of the tag values will be updated and accordingly some of these tag values will be left as pointing to older virtual registers which may serve as sources for the still up-to-date copies of those portions of the data granule (e.g. flag value V or flag values C, V) that are stored in those older registers.

Figure 3:
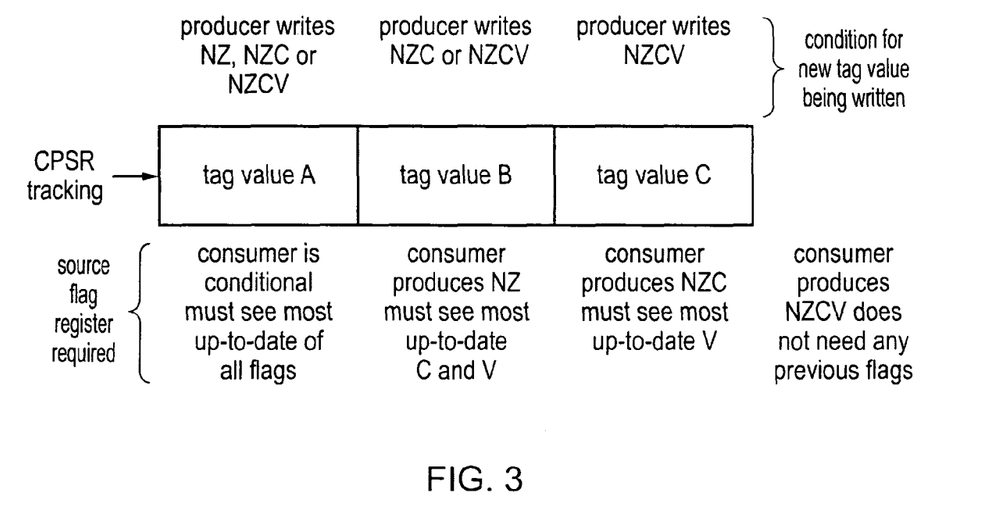
FIG. 3 schematically illustrates tag data associated with a data granule for which multiple tag values are formed relating to the update of different portions of that data granule.

FIG. 3 schematically illustrates use of the tag data used for the flag register CPSR tracking. In particular, for each of the three tag values A, B and C forming the tag data there is indicated the relationship between producer instructions and the flags that they will write compared with the tag values which they will update together with the relationship between consumer instructions and what they will draw from preceding flag values and the tag value that they will use to identify the source register for those preceding flag values. Thus, the condition for writing a new tag value to tag value A will be that the producer writes either flags: N and Z; N, Z and C; or N, Z, C and V. The condition for consuming tag value A is that the consuming instruction is conditional and must be able to read the most up-to-date value of all of the flags. In respect of tag value B, the condition for writing a new tag value to tag value B is that the producer instruction writes flags either: N, Z and C; or N, Z, C and V. The condition for a consumer reading tag value B as the source for its previous flags is that the consumer will itself produce flag values N, Z and accordingly only the most up-to-date versions of the flags C and V will be needed as written by a preceding instruction. Finally, the condition for a producer instruction writing tag value C is that the producer instruction writes flags N, Z, C and V. The condition for a consumer instruction reading its previous flags from the source register indicated by tag value C is that the consumer itself will produce flags N, Z, C and accordingly only need draw the most up-to-date version of flag V from a preceding instruction.

It will be seen from FIG. 3 that the data granule comprising the flag register CPSR is tracked using three different tag values relating to potential source registers that may be utilised for different portions of the data granule which are required by a consuming instruction. This generally permits a lengthening of dependency chains.

Figure 4:
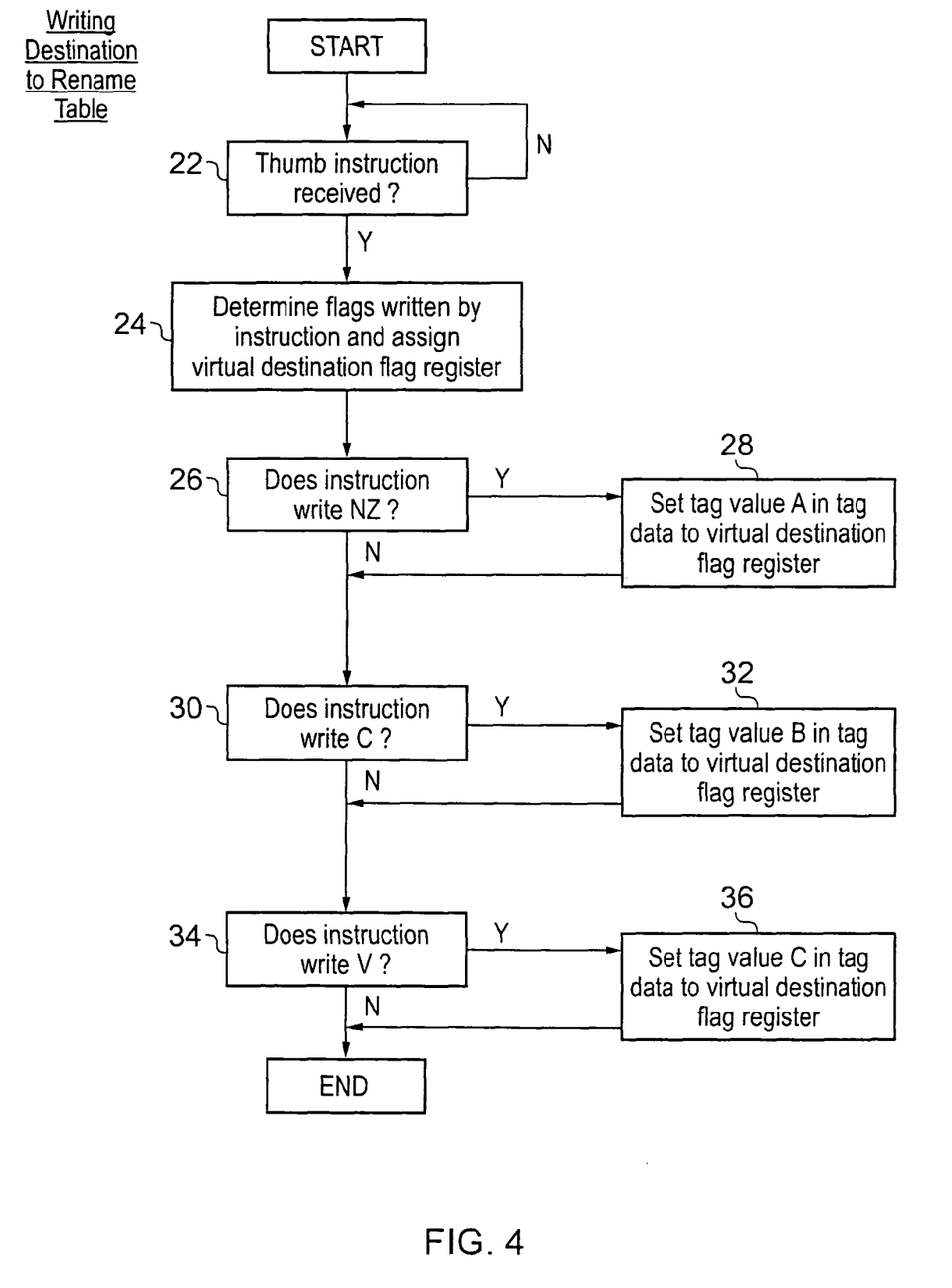
FIG. 4 is a flow diagram schematically illustrating the control of a process for writing destination registers to the rename table.

FIG. 4 is a flow diagram schematically illustrating one way in which the rename circuitry 8 of FIG. 1 may control the writing of virtual destination register values into respective tag values for the flag register CPSR. At step 22 processing waits for an instruction requiring flags (e.g. a conditional instruction or one of the Thumb data processing instructions) to be received. At step 24 a determination of the flags written by the instruction is made and an assignment of a virtual destination flag register is made. This assignment may be made using a "freelist" indicating available virtual registers within the register store 18 which are not currently allocated as being mapped to an architectural register and holding a value which is still required to be read by an "in flight" instruction. The virtual register to be used can be popped of this freelist of available virtual registers and this same value for the virtual register is used for each of tag value A, tag value B and tag value C if these are being written as described below.

Step 26 determines whether or not the instruction writes flags N, Z. If the instruction does write flags N, Z, then step 28 sets the tag value A in the tag data to match the virtual destination flag register selected at step 24.

Step 30 a determines whether or not the instruction writes flag C. If the instruction does write flag C, then step 32 sets the tag value B in the tag data to indicate the virtual destination flag register selected at step 24.

Step 34 determines whether or not the instruction writes flag V. If the instruction does write flag V then step 36 sets the tag value C in the tag data to indicate the virtual destination flag register selected at step 24.

In this way, depending upon which flags are written by a particular instruction the destination flag register is written as:

Tag value A;
Tag value A and tag value B; or
Tag value A, tag value B and tag value C.

Figure 5:
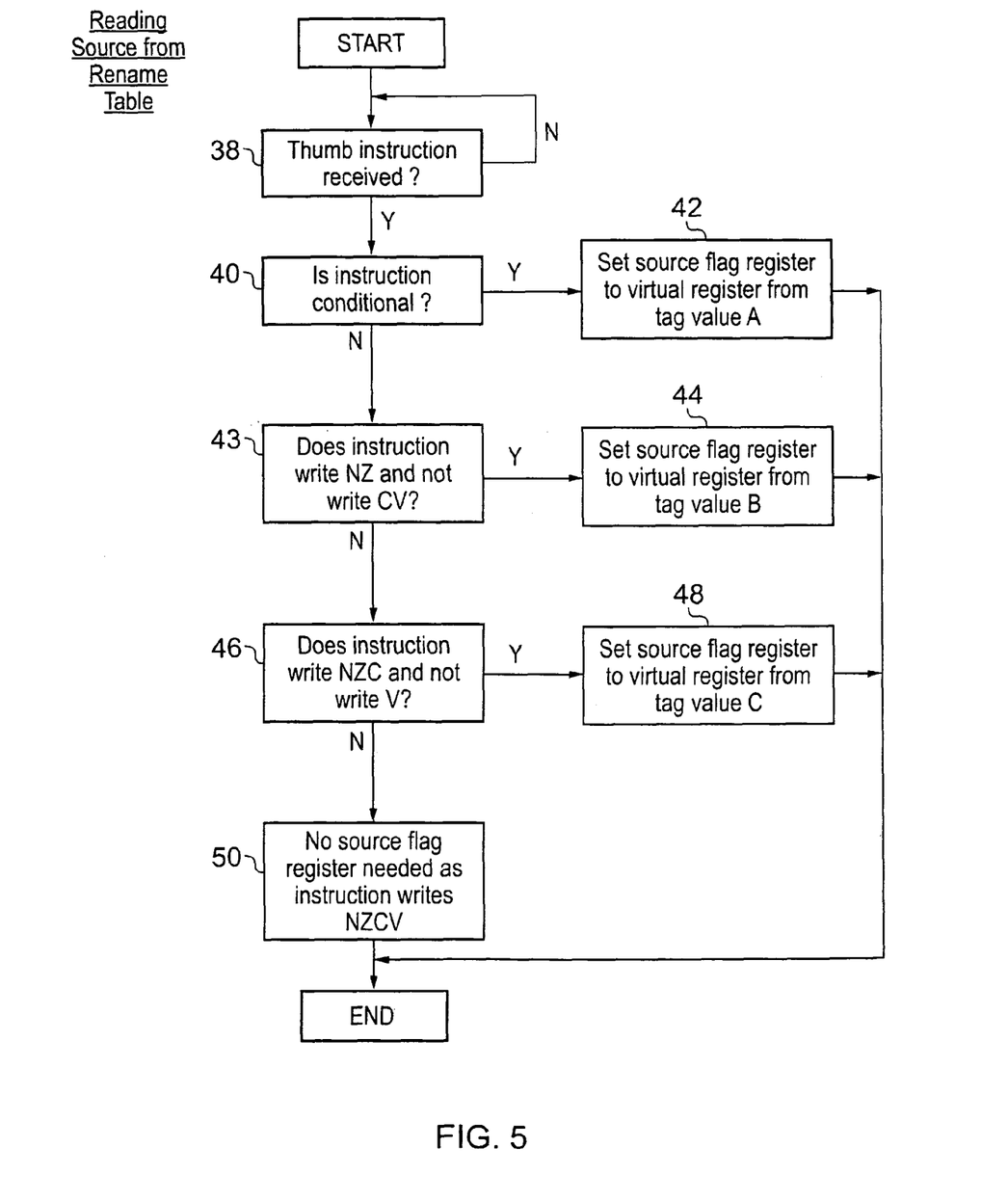
FIG. 5 is a flow diagram schematically illustrating the control of a process for reading source registers from the rename table.

FIG. 5 is a flow diagram schematically illustrating the process of controlling which virtual register will serve as a source for reading an input operand required by a received instruction. At step 38 processing waits for a Thumb instruction to be received. Step 40 identifies if the instruction is a conditional instruction. If the instruction is a conditional instruction then it will need to read all of the flag values N, Z, C and V. Accordingly, step 42 sets the source flag register for this instruction to be tag value A.

Step 43 determines whether the instruction is one which writes flags N, Z and does not write flags C, V. If the instruction is this type of instruction, then step 44 sets the source flag register to the virtual register from tag value B. The tag value B virtual register stores the most up-to-date copies of the flags C, V, but does not necessarily store the most up to date version of the flags N, Z. However, as the instruction identified at step 43 will be writing new values of the flags N, Z, there is no need for these to be read by the instruction and be an input operand thereto.

Step 46 determines whether or not the instruction writes flags N, Z, C and does not write flag V. If the instruction does match this condition then step 48 sets of the source flag register to the virtual register indicated by the tag value C. The virtual register indicated by the tag value C will hold the most up-to-date value for the flag V although it may not hold the most up-to-date values of flags N, Z, C.

If the instruction has not been identified by any of steps 40, 43 and 46, then processing will reach step 50 where it is determined that no source flag register is needed for that instruction as that instruction will itself write new values for all of the flags N, Z, C and V.

Figure 6:
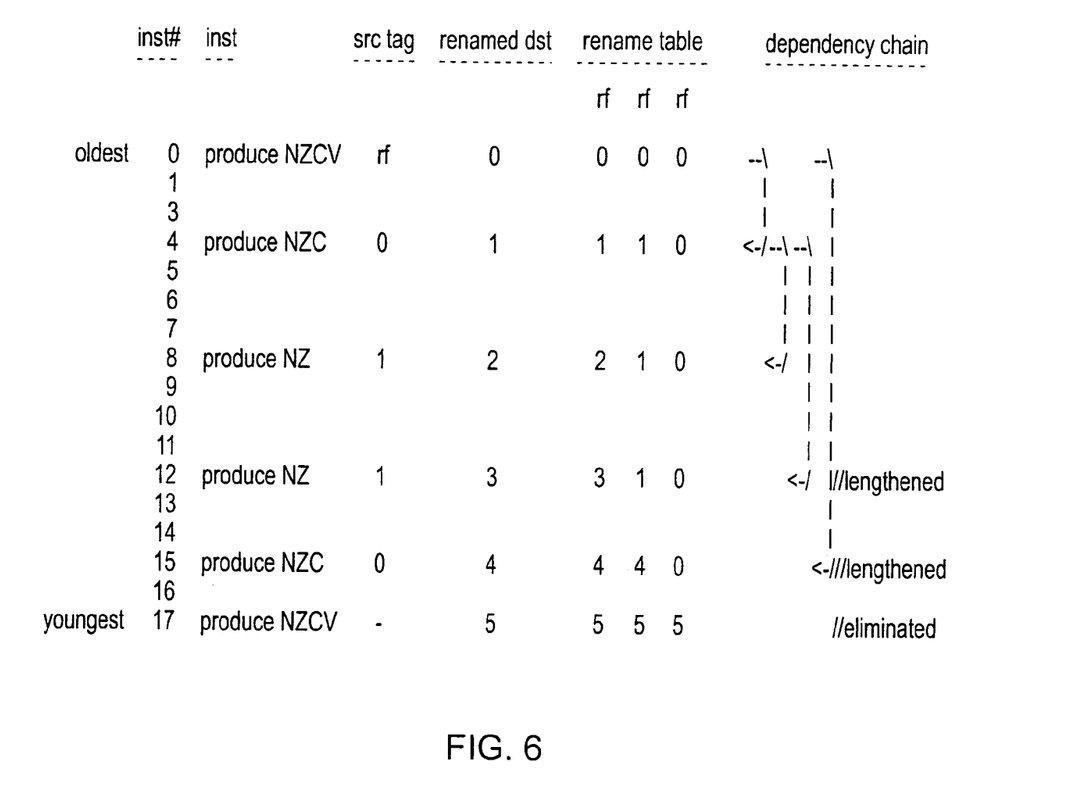
FIG. 6 schematically illustrates an example of dependency between producer and consumer instructions when utilising the present technique.

FIG. 6 illustrates the dependency chain arising between a stream of program instructions extending between an oldest instruction and a youngest instruction. Not all instructions produce flags and accordingly not all will need to read earlier flag values. Instruction 0 produces all of the flags N, Z, C and V. In accordance with the processing illustrated in FIG. 4, the tag values A, B and C will all be set to point to the destination register "0" associated with this instruction 0.

Instruction 4 produces flags N, Z and C. The destination register "1" is selected into which these new flag values are to be written. This destination register "1" will accordingly now store the most up-to-date version of the flags N, Z, C. However, the oldest register storing an up-to-date version of flag V will still be register "0". Accordingly, tag value C will be left as "0".

In a similar way, instruction 8 produces flags NZ and accordingly will update tag value A while leaving tag values B and C unaltered.

Instruction 12 again produces flags N, Z and requires up to date versions of flags C, V. These up-to-date versions of flags C, V can however be taken from register "1" as this was the destination used for the flags of the last producer instruction which produces one of C and V, namely instruction 4. This is a lengthened dependency chain compared to merely referring back to the most recent instruction which updated any of the flags.

Instruction 15 produces flags N, Z and C and only consumes Flag V. Accordingly, the oldest producer instruction which changed the value of flag V is instruction 0 which wrote its flag values to destination register "0" as indicated by tag value C. It will again be seen that the dependency chain length has been increased making it easier to issue instruction 15 sooner than if it were simply waiting for writing of the flag values by the immediately preceding flag generating instruction.

Instruction 17 produces all of the flag values N, Z, C and V and accordingly need not read any preceding flag values and so it requires no dependency chain.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:

processing circuitry, responsive to a stream of program instructions having a program order running from old to young, configured to perform a corresponding stream of data processing operations, at least some of said data processing operations writing one or more values to at least a portion of a data granule;

a register store having a plurality of registers, each of said registers configured to store a data granule written in dependence upon said data processing operations;

register renaming circuitry, responsive to a program instruction of said stream of program instructions specifying a data processing operation, configured to identify a destination register to store a data granule that is an output operand of said data processing operation; and rename table circuitry, coupled to said register renaming circuitry and responsive to identification of said destination register, configured to store tag data identifying which of said plurality of registers is said destination register storing a latest copy of said data granule, said processing circuitry is responsive to said tag data and configured to identify a source register currently associated with an oldest up-to-date copy of one or more values that are an input operand of a younger program instruction within said stream of program instruction;

wherein different groups of data processing operations set different values within said data granule, said tag data comprises a plurality of tag values for at least one data granule, different tag values tracking writes to differing subsets of values of said data granule and each tag value identifying a respective one of said plurality of registers, and said rename table circuitry is responsive to said data processing operation to determine which of values of said data granule are updated values written by said data processing operation and is configured (i) to store tag values identifying said destination register as storing at least one of said updated values to those tag values of said plurality of tag values tracking writes to at least one of said updated values; and (ii) to leave those tag values of said plurality of tag values not tracking writes to at least one of said updated values as identifying respective destination registers storing values set by one or more preceding processing operations.

2. Apparatus as claimed in claim 1, wherein said processing circuitry includes issue circuitry to issue processing operations to be performed, wherein said issue circuitry does not issue a processing operation corresponding to said younger program instruction until said source register has been written.

3. Apparatus as claimed in claim 1, wherein each tag value has a set of written values, said sets of written values being related in a hierarchy such that when traversing said hierarchy from a set with fewest elements to a set with most elements, each set is a proper subset of any following sets.

4. Apparatus as claimed in claim 1, wherein said one or more values written are flag values, said data granule is a plurality of flags, said plurality of register are a plurality of flag registers.

5. Apparatus as claimed in claim 4, wherein said plurality of flags comprise four flags N, Z, C and V and said sets are formed such that:
a first set corresponding to a first tag value is associated with flags N and Z;
a second set corresponding to a second tag value is associated with flags N, Z and C; and
a third set corresponding to a third tag value is associated with flags N, Z , C and V.

6. Apparatus as claimed in claim 4, wherein said plurality of flags are flags of a current program status register.

7. Apparatus as claimed in claim 1, wherein said processing circuitry performs a plurality of processing operations in parallel.

8. Apparatus as claimed in claim 7, wherein said processing operations performed in parallel are non-conditional processing operations.

9. Apparatus as claimed in claim 1, wherein said processing operations performed are processing operations of a Thumb instruction set.

10. Apparatus as claimed in claim 1, wherein said processing circuitry performs out-of-order execution of said program instructions.

11. Apparatus as claimed in claim 1, wherein said processing circuitry performs a processing operation over a plurality of processing cycles.

12. Apparatus as claimed in claim 1, wherein said data granule is a SIMD value comprising a plurality of separate values that are individually writable.

13. Apparatus as claimed in claim 1, wherein said plurality of registers are part of a register store addressable as registers of a plurality of different sizes and said data granule is a register of greater than a smallest register size of said plurality of different sizes.

14. Apparatus for processing data, said apparatus comprising:
processing circuitry, responsive to a stream of program instructions having a program order running from old to young, configured to perform a corresponding stream of data processing operations, at least some of said data processing operations setting one or more flags within a plurality of flags;

a register store having a plurality of flag registers each of said registers configured to store a plurality of flags set in dependence upon said data processing operations;

register renaming circuitry, responsive to a program instruction of said stream of program instructions specifying a data processing operation, configured to identify a destination flag register to store one or more flags that are an output operand of said data processing operation; and rename table circuitry, coupled to said register renaming circuitry and responsive to identification of said destination flag register, configured to store tag data identifying which of said plurality of flag registers is said destination flag register storing a latest copy of said plurality of flags, said processing circuitry is responsive to said tag data and configured to identify a source flag register currently associated with an oldest up-to-date copy of one or more flags that are an input operand of a younger program instruction within said stream of program instruction; wherein different groups of data processing operations set different flags within said plurality of flags, said tag data comprises a plurality of tag values for said plurality of flags, different tag values being associated with differing subsets of flags of said plurality of flags and each tag value identifies a respective one of said plurality of flag registers, and said rename table circuitry is responsive to said data processing operation to determine which of said plurality of flags are updated flags set by said data processing operation and
is configured (i) to store said tag data identifying said destination flag register as at least part of those tags values of said plurality of tag values associated with at least one of said updated flags; and (ii) to leave those tag values of said plurality of tag values not associated with at least one of said updated flags as identifying respective destination flag registers storing flag values set by one or more preceding processing operations.

15. Apparatus for processing data, said apparatus comprising:
processing means, responsive to a stream of program instructions having a program order running from old to young, for performing a corresponding stream of data processing operations, at least some of said data processing operations writing one or more values to at least a portion of a data granule;
register store means having a plurality of registers each of said registers comprising a means for storing a data granule written in dependence upon said data processing operations;
register renaming means, responsive to a program instruction of said stream of program instructions specifying a data processing operation, for identifying a destination register to store a data granule that is an output operand of said data processing operation; and
rename table means, coupled to said register renaming means and responsive to identification of said destination register, for storing tag data identifying which of said plurality of registers is said destination register storing a latest copy of said data granule, said processing means is responsive to said tag data for identifying a source register currently associated with an oldest up-to-date copy of one or more values that are an input operand of a younger program instruction within said stream of program instruction, wherein different groups of data processing operations set different values within said data granule, said tag data comprises a plurality of tag values for at least one data granule, different tag values tracking writes to differing subsets of values of said data granule and each tag value identifying a respective one of said plurality of registers, and said rename table means, responsive to said data processing operation, for determining which of values of said data granule are updated values written by said data processing operation and (i) for storing tag values identifying said destination register as storing at least one of said updated values to those tag values of said plurality of tag values tracking writes to at least one of said updated values; and (ii) for leaving those tag values of said plurality of tag values not tracking writes to at least one of said updated values as identifying respective destination registers storing values set by one or more preceding processing operations.

16. A method of processing data comprising:
performing, in response to a stream of program instructions having a program order running from old to young, a corresponding stream of data processing operations, at least some of said data processing operations writing one or more values to at least a portion of a data granule;
storing a data granule written in dependence upon said data processing operations in a register of a register store having a plurality of registers;
identifying, in response to a program instruction of said stream of program instructions specifying a data processing operation, a destination register to store a data granule that is an output operand of said data processing operation;
storing, in response to identification of said destination register, tag data identifying which of said plurality of registers is said destination register storing a latest copy of said data granule and, in response to said tag data, identifying a source register currently associated with an oldest up-to-date copy of one or more values that are an input operand of a younger program instruction within said stream of program instruction, wherein different groups of data processing operations set different values within said data granule, said tag data comprises a plurality of tag values for at least one data granule, different tag values tracking writes to differing subsets of values of said data granule and each tag value identifying a respective one of said plurality of registers;
determining, in response to said data processing operation, which of values of said data granule are updated values written by said data processing operation;
(i) storing tag values identifying said destination register as storing at least one of said updated values to those tag values of said plurality of tag values tracking writes to at least one of said updated values; and
(ii) leaving those tag values of said plurality of tag values not tracking writes to at least one of said updated values as identifying respective destination registers storing values set by one or more preceding processing operations.

* * * * *